UNITED STATES PATENT OFFICE.

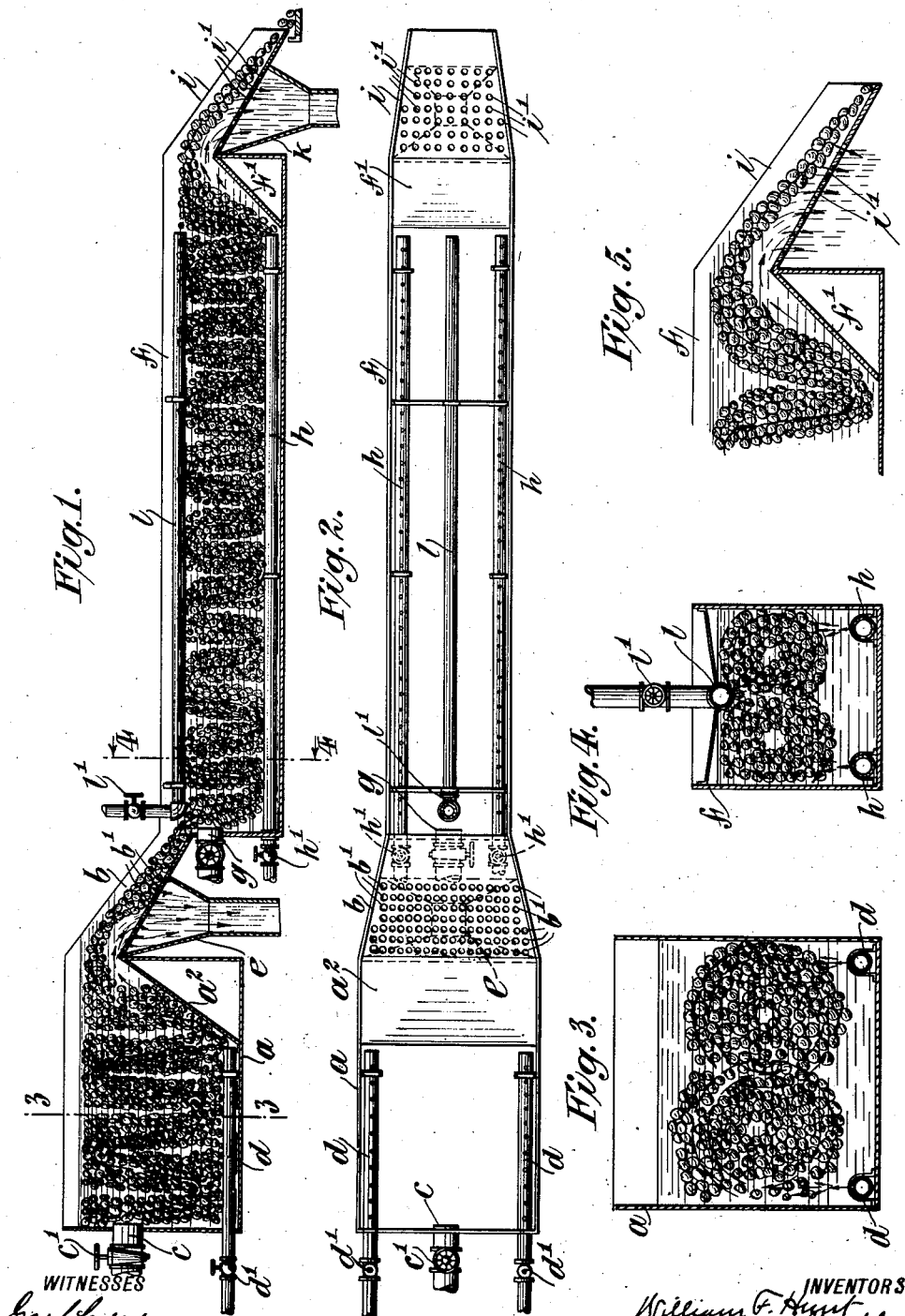

WILLIAM F. HUNT, OF NEW BRIGHTON, AND FRED E. MURPHY, OF WEST NEW BRIGHTON, NEW YORK, ASSIGNORS TO C. W. HUNT COMPANY, OF WEST NEW BRIGHTON, NEW YORK, A CORPORATION OF NEW YORK.

METHOD AND APPARATUS FOR WASHING FRUIT, &c.

1,047,639.  Specification of Letters Patent. Patented Dec. 17, 1912.

Application filed February 16, 1912. Serial No. 677,989.

*To all whom it may concern:*

Be it known that we, WILLIAM F. HUNT and FRED E. MURPHY, both citizens of the United States, residing, respectively, in New Brighton and West New Brighton, Richmond county, State of New York, have invented certain new and useful Improvements in Methods and Apparatus for Washing Fruit, &c., of which the following is a specification, reference being had to the accompanying drawing, which forms a part hereof.

Citrus and other firm fruits are commonly washed in preparation for the market and for cooking, preserving, etc., by soaking and brushing or scrubbing between opposite brushing or scrubbing surfaces with both of which the fruit is in contact. This method of washing is not applicable to softer fruits, such as tomatoes, and is not wholly satisfactory for the treatment of firmer fruits and vegetables since it involves the breaking up of the softer fruits and more or less abrasion of the outer skin of even the firmer fruits and vegetables.

It is the object of this invention to provide an effective method of and apparatus for the thorough cleansing of all fruits and vegetables without danger of breaking up the fruit or of abrading injuriously the outer skin.

In accordance with the invention the fruits or vegetables to be washed are delivered to one end of a trough-like container, to which is also supplied a sufficient volume of water to cause the whole mass of fruits or vegetables to move slowly forward to the farther end of the container, from which both the fruits or vegetables and the water are permitted to escape, the fruits or vegetables being separated from the wash water. In the passage of the mass of fruits or vegetables through the container a rotation of each longitudinal half of the mass of fruits or vegetables and water about its longitudinal axis is produced by jets of air admitted at the bottom of the container adjacent to the sides thereof so that the two longitudinal halves of the entire mass, while progressing toward the delivery end of the container, also rotate about their longitudinal axes in opposite directions, whereby the fruits or vegetables of the two rotating masses collide with each other along the central plane, while moving in the same general direction, both longitudinally and rotarily, and, through the innumerable gentle collisions of the fruits or vegetables, while they are immersed in the water, their surfaces are cleansed of all foreign matter.

The method and the apparatus in which it may be practiced will be more fully explained hereinafter with reference to the accompanying drawing in which they are illustrated and in which—

Figure 1 is a view in longitudinal section of a suitable form of apparatus for the practice of the method, the movement of the fruit or vegetables being indicated rather than accurately represented. Fig. 2 is a top view of the apparatus shown in Fig. 1. Fig. 3 is a view in transverse section on the plane indicated by the line 3—3 of Fig. 1. Fig. 4 is a view in transverse section on the plane indicated by the line 4—4 of Fig. 1. Fig. 5 is a detail view in longitudinal section of the discharge end of the apparatus, but without the funnel shown in Fig. 1.

The apparatus shown in the drawing comprises two parts, one adapted for a preliminary cleansing of the fruits or vegetables and the other for a final cleansing thereof. The method, as carried out in each part of the apparatus, is essentially the same, although the second part of the apparatus is shown as adapted for the performance of one step in addition to the method as performed in the other or preliminary part.

The first part of the apparatus comprises a suitable container *a*, which is preferably rectangular in cross section and is provided at one end with a discharge chute *b*, the bottom of which is preferably inclined, as shown, and provided with openings *b'* through which the liquid, usually water, is drained from the fruit or vegetables. At the end opposite the discharge chute *b* a large volume of water is admitted, preferably with a low velocity, a suitable pipe *c*, provided with a valve *c'*, being shown as adapted for this purpose. The fruits or vegetables are placed in the container *a* at the inlet end and the entire mass moves slowly toward the discharge end with the natural flow of the water by which it is supported or in which it is suspended. At the same time the mass receives a relatively rapid movement of rotation about two longitudinal axes, one for each half of the mass. This movement of rotation is effected by the discharge of air jets distributed along each side of the container near the bottom thereof and directed upwardly along the adjacent wall of the container which gives direction to the upwardly moving current. The individual fruits or vegetables of the two helical streams so formed, thus collide along the middle plane with great frequency and somewhat forcibly but yet so gently as to avoid actual abrasion of the skin. The air jets may be supplied through perforated pipes $d$, from any suitable source, such pipes being provided, externally of the container, with valves $d^1$. The fruits or vegetables having approximately the specific gravity of the liquid, flow out from the container with the sustaining liquid, through the discharge chute $b$ the bottom of which is preferably perforated as at $b'$, so as to permit the water to separate from the fruits or vegetables. A funnel $e$ may be placed below the chute to carry away the water. An incline $a^2$ may be placed in the container, near its discharge end, to facilitate the movement of the fruits or vegetables from the container into the discharge chute. The dirt which is loosened from the surface of the fruit settles in some part at the bottom of the container from which it may be removed from time to time and in some part is carried from the container in suspension in the water and passes therewith through the perforated bottom of the chute.

In the apparatus shown, the fruits or vegetables, after the preliminary washing in the first part of the apparatus, are discharged into a second container $f$ in which they are subjected to a similar treatment, such container being provided with a valved inlet $g$ for the softening and sustaining liquid, also in large volume and at relatively low velocity, and near its bottom, with perforated pipes $h$ for the admission of vertically directed jets of air under pressure, such pipes being provided externally of the container with suitable valves $h'$. The container $f$ is also provided with a discharge chute $i$, having an inclined, perforated bottom $i'$, beneath which may be placed a funnel $k$, and also with an incline $f'$ near the discharge chute to facilitate the discharge of the fruits or vegetables.

The apparatus shown is designed particularly for the washing of tomatoes which, as they are received from the field without careful picking over, sometimes have spots of decay. It is desirable, especially where the tomatoes are to be used at once for canning, etc., that these spots of decay shall be washed out. To accomplish this jets of water under pressure are directed upon the tomatoes, preferably as they come to the surface of the water in their forward movement in a spiral path or in spiral paths through the container. Accordingly a longitudinal perforated pipe $l$ is supported in the container, preferably at the surface of the liquid therein and is connected, through a controlling valve $l'$, with a pump or other source of water under pressure. The jets of water from the pipe $l$ are directed downwardly, as shown in Fig. 4, against the tomatoes and it is found that by these jets, which impinge against the tomatoes with considerable force, the decayed spots are thoroughly washed out, in the course of the travel of the tomatoes through the container, without washing out any considerable portion of the sound pulp. At the end of the container $f$ the mass of fruits or vegetables and the sustaining water flow out through the chute $i$. The water, carrying with it the suspended dirt and decayed matter, escapes through the perforated bottom of the chute and the washed fruits or vegetables are discharged at the end of the chute. Such dirt as may settle on the bottom of the container $f$ may be removed from time to time by any suitable means.

The size and proportions of the containers as well as the arrangement of the water inlets, discharge chutes, air jet pipes and water jet pipes, will be varied to suit different conditions of use.

We claim as our invention:—

1. The method of washing fruits, etc., which consists in suspending the fruits in a liquid, supplying liquid in relatively large volume and at relatively low velocity to cause the whole mass of fruits to move forward, and simultaneously directing air jets upwardly against the mass at opposite sides or in the same direction to cause the two longitudinal halves of the mass to rotate about their respective longitudinal axes and to collide along the central plane.

2. The method of washing fruits, etc., which consists in suspending the fruits in a liquid, supplying liquid in relatively large volume and at relatively low velocity to cause the whole mass of fruits to move forward, simultaneously directing air jets upwardly against the mass at opposite sides but in the same direction to cause the two longitudinal halves of the mass to rotate about their respective longitudinal axes and to collide along the central plane, and directing jets of liquid downwardly against the top of the mass and centrally with respect to the two halves thereof.

3. The method of washing fruits, etc., which consists in introducing the fruits at one end of a container, supplying liquid in relatively large volume and at relatively low velocity to cause the whole mass of fruits to move forward, simultaneously directing air jets upwardly against the mass at opposite sides of the container but in the same direction to cause the two longitudinal halves of the mass to rotate about their respecitve longitudinal axes and to collide along the central plane, and permitting the fruits and liquid to flow from the container at the other end.

4. Apparatus for washing fruits, etc., comprising a container to receive the fruits and a liquid, means to supply liquid at one end of the container said means producing a longitudinal current therein, means to permit the escape of the fruits and liquid at the other end of the container, and means to supply air jets near the bottom of the container at opposite sides adjacent to the side walls of the container to cause rotation of the two halves of the mass about their respective axes and collision along the central plane.

5. Apparatus for washing fruits, etc., comprising a container to receive the fruits and a liquid, means to supply fluid jets near the bottom of the container at opposite sides thereof to cause rotation of the two halves of the mass about their respective axes, and means to supply jets of liquid at the top of the mass and centrally with respect to the two halves thereof.

6. Apparatus for washing fruits, comprising a container to receive the fruits and a liquid and having a discharge chute with a grating at one end, means to supply liquid at the other end said means producing a longitudinal current therein, and means to supply jets of air under pressure within the container and near the bottom thereof at opposite sides adjacent to the side walls thereof to cause rotation of the two halves of the mass about their respective axes and collision along the central plane.

7. Apparatus for washing fruits, comprising a container to receive the fruits and a liquid and having a discharge chute at one end, means to supply liquid at the other end said means producing a longitudinal current therein, means to supply jets of air under pressure within the container and near the bottom thereof at the side to cause the mass of fruits to rotate about its longitudinal axis, and means to cause jets of liquid under pressure to impinge upon the fruits.

This specification signed and witnessed this 14th day of February A. D., 1912.

WILLIAM F. HUNT.
FRED E. MURPHY.

Signed in the presence of—
C. E. SIMPSON,
CHAS. KNIGHT.